United States Patent [19]

Rauckhorst, III et al.

[11] Patent Number: 5,356,096
[45] Date of Patent: Oct. 18, 1994

[54] SKIN FOR A DEICER

[75] Inventors: Richard L. Rauckhorst, III, North Canton; Kevin L. Leffel, Akron, both of Ohio

[73] Assignee: The BFGoodrich Company, Akron, Ohio

[21] Appl. No.: 998,360

[22] Filed: Dec. 30, 1992

[51] Int. Cl.⁵ .............................................. B64D 15/00
[52] U.S. Cl. .................................................. 244/134 A
[58] Field of Search .......... 244/134 R, 134 A, 134 D; 156/313

[56] References Cited

U.S. PATENT DOCUMENTS

| | | | |
|---|---|---|---|
| 3,951,190 | 4/1976 | Suter | 244/135 B |
| 4,463,919 | 8/1984 | Bac | 244/134 A |
| 4,687,159 | 8/1987 | Kageorge | 244/134 A |
| 4,706,911 | 11/1987 | Briscoe et al. | 244/134 A |
| 4,836,474 | 6/1989 | Briscoe et al. | 244/134 A |
| 5,022,612 | 6/1991 | Berson | 244/134 A |
| 5,098,037 | 3/1992 | Leffel et al. | 244/134 A |
| 5,129,598 | 7/1992 | Adams et al. | 244/134 D |

*Primary Examiner*—Margaret A. Focarino
*Assistant Examiner*—Christopher P. Ellis
*Attorney, Agent, or Firm*—Richard A. Romanchik

[57] ABSTRACT

An aircraft deicing assembly 101 for attachment to an airfoil 99 includes a deflection shell 101 disposed over a deflection means 102. The deflection shell is comprised of a primary layer 116 comprised of a high strength fabric reinforced with a phenolic resin and a backing layer 115 comprised of a high strength fabric reinforced with an epoxy resin. The thickness of the backing layer is varied as a function of curvature of the airfoil and spanwise length of the airfoil.

16 Claims, 2 Drawing Sheets

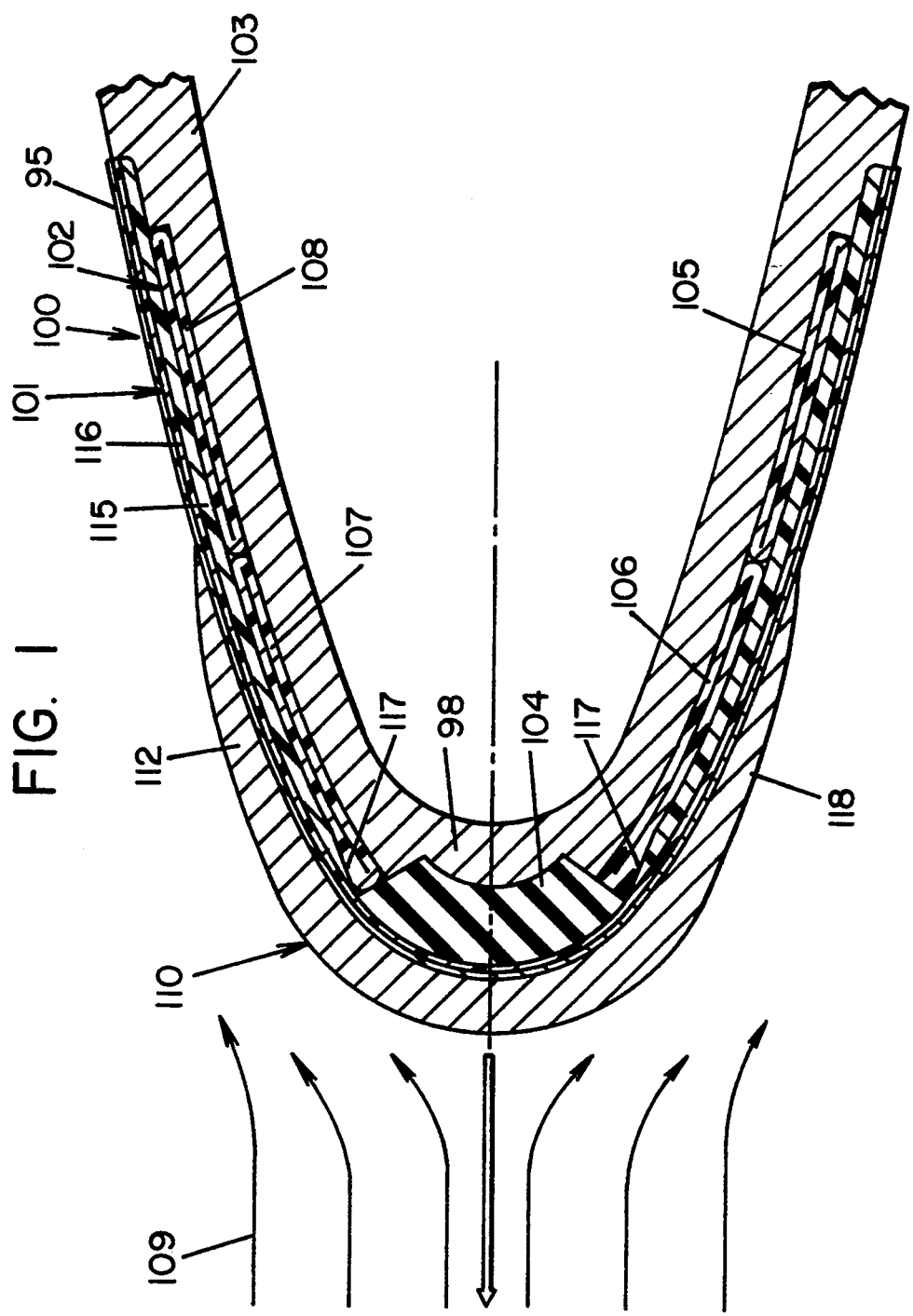

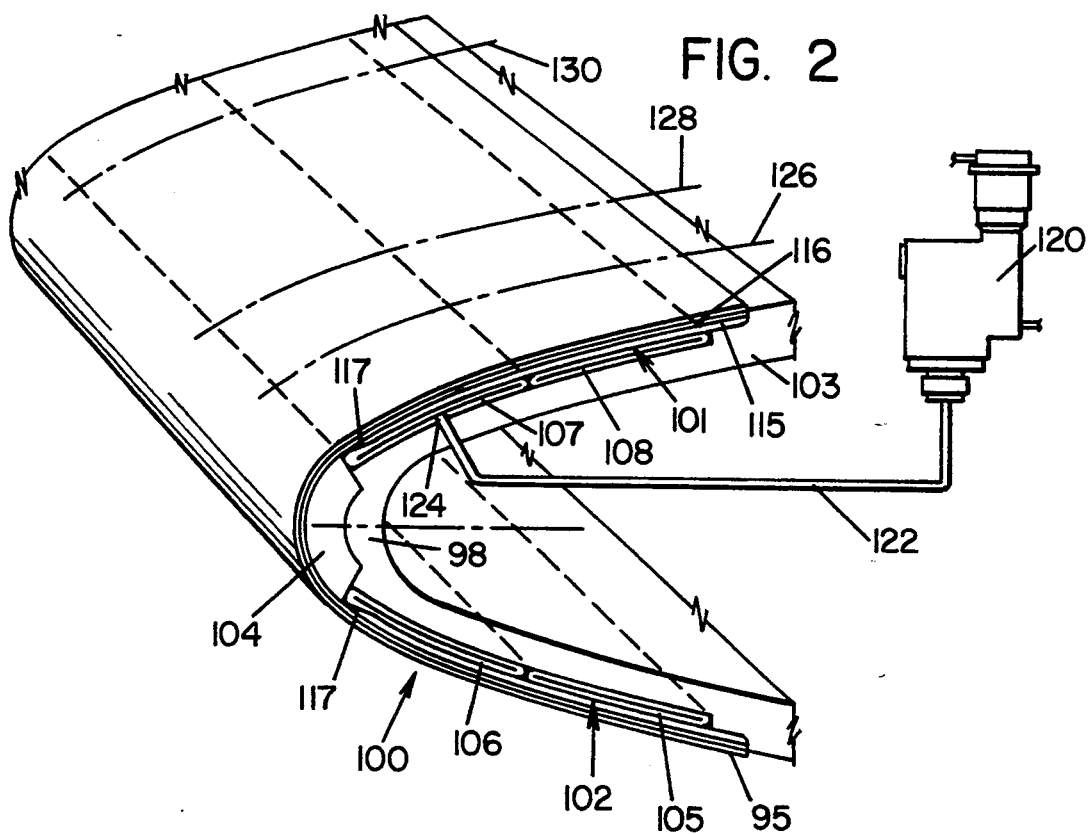
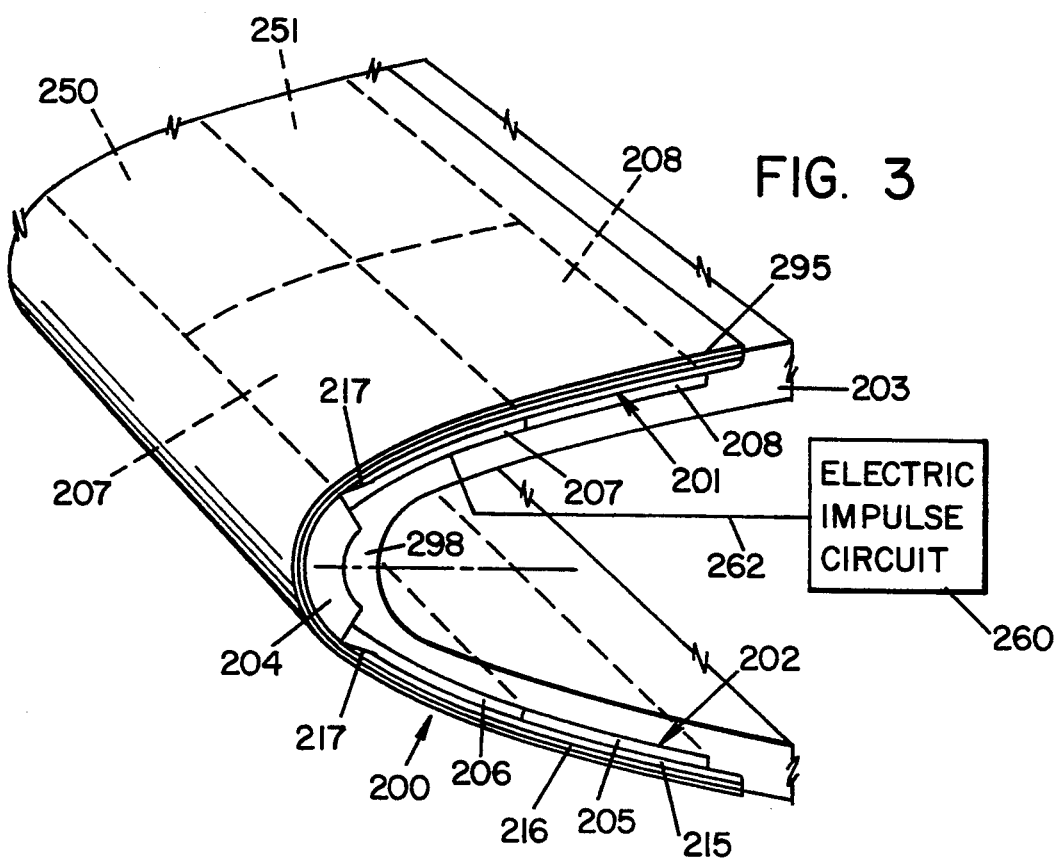

SKIN FOR A DEICER

FIELD OF THE INVENTION

Invention relates to aircraft deicer assemblies that utilize mechanical dynamics to expel ice on the leading edges of various aircraft structures accumulated during flight in atmospheric icing conditions, and more particularly a deicer assembly having a selectively reinforced primary layer.

BACKGROUND OF THE INVENTION

In recent years, many aircraft manufacturers have sought improved ice protection systems to enable aircraft to safely fly in atmospheric icing conditions. Ice accumulations on the leading edge surfaces of various aircraft structures can seriously effect the aerodynamic characteristics of an aircraft. Conventional pneumatic deicers, electrothermal deicers and bleed air anti-icers have been used for many years on general aviation or commercial aircraft. These ice protection techniques are described in detail by Technical Report ADS-4, Engineering Summary of Airframe Icing Technical Data published by the Federal Aviation Agency, Dec. 1963. In spite of these proven techniques, many companies have expressed a desire for new systems having better ice removal performance, better life and reliability, and decreased weight and energy requirements.

In response to this need, a class of systems has been developed that utilize a force displacement generation means to dynamically activate a thin deflectable primary layer upon which ice accumulates. The dynamic activation induces rapid motion in the thin deflectable skin sufficient to dynamically debond, shatter and expel an accumulated ice cap into surrounding airflow. As will be discussed more fully, the force displacement generation means can take a variety of forms.

In some devices, the force displacement generation means are combined with the thin deflectable primary layer to form a unitary deicer. The unitary deicer is generally formed in a thin sheet that can be subsequently bonded to the exterior surface of an existing aircraft structure. The deicer is usually designed to be removed from the aircraft structure and replaced in the field requiring the use of a replaceable adhesive such as 3M 1300L rubber cement. Examples are presented in U.S. Pat. No. 4,706,911 METHOD AND APPARATUS FOR DEICING A LEADING EDGE, Briscoe et al. (hereinafter referred to as the Pneumatic Impulse Patent), U.S. Pat. No. 4,875,644 ELECTRO-REPULSIVE SEPARATION SYSTEM FOR DEICING, Adams et al. (hereinafter referred to as the Electro-Repulsive Patent), and U.S. Pat. No. 5,129,598 ATTACHABLE ELECTRO-IMPULSE Deicer, Adams et al. (hereinafter referred to as the Electro-Impulse Patent).

In other devices, the force displacement generation means are combined with the thin deflectable primary layer and a substructure thereby forming a unitary leading edge with integral deicing capability. This unitary leading edge structure replaces the entire leading edge of an aircraft structure such as a wing, engine inlet, horizontal stabilizer, or vertical stabilizer. An example of this type of device is presented in U.S. Pat. No. 5,098,037 STRUCTURAL AIRFOIL HAVING INTEGRAL EXPULSIVE SYSTEM, Leffel et al. (hereinafter referred to as the Integrated Pneumatic Impulse Patent).

In the Electro-Repulsive Patent, the force displacement generation means comprises an upper array of conductors and a lower array of conductors. The upper conductors are substantially parallel to each other and to adjacent conductors in the lower layer. The upper conductors are connected in series with the lower conductors so that a single continuous conductor is formed that passes from the upper layer, around the lower layer, back around the upper layer, and so on. Upon application of an electrical potential to the input leads, current is developed in the upper conductors that is in the same direction in all upper conductors. Likewise, current is developed in the lower conductors that is in the same direction in all lower conductors, but opposite to the direction of the current in the upper conductors. As explained in the Electro-Repulsive Patent, maintaining a constant current direction in all the conductors of a layer greatly increases the separation force between the two layers.

After installation of the deicer on a structural member (such as a leading edge), the upper and lower conductors are sandwiched between the structural member and a surface ply. Upon application of a high magnitude short duration current pulse, opposing electromagnetic fields in the upper and lower layers forcefully repel each other. This motion induces a dynamic motion into the surface ply which dynamically removes accumulated ice. As described in the Electro-Repulsive Patent, a current pulse that rises to between 2300 and 3100 amperes within 100 microseconds generates effective ice removal. A circuit for generating such a pulse is described in the Electro-Repulsive Patent. The circuit includes a pulse forming network, but this is not absolutely necessary.

Another form for force displacement generation means utilizing electromagnetic apparatus is illustrated by the Electro-Impulse Patent. A planar coil comprising at least one coiled conductor is sandwiched between a surface ply and a conductive substructure (such as an aluminum leading edge). Planar coils are described in great detail in U.S. Pat. No. 5,152,480 PLANAR COIL CONSTRUCTION, Adams et al. (hereinafter referred to as the Planar Coil Patent). As described in the Electro-Impulse Patent, a high magnitude short duration current pulse is applied to the coil. The current in the coil induces a strong rapidly changing electromagnetic field. The electromagnetic field generates eddy currents in the conductive substructure which, in turn, generates an opposing electromagnetic field. The two electromagnetic fields repel each other causing a repelling force between the coil and the substructure. The coil induces dynamic motion into the surface ply thereby dynamically removing accumulated ice. Effective ice removal is generated by a peak current of about 3000 amperes rising in a period of 100 microseconds. An electrical circuit for generating such a pulse is disclosed. The circuit is very similar to the circuit disclosed in the Electro-Repulsive Patent.

In the previous example, the force displacement generation means is composed of a single unitary planar coil. As described in the Planar Coil Patent, the single unitary coil can be formed from two or more superposed spiral shaped coils that are interleaved with thin dielectric layers and bonded together. A slightly different variation is required if the substructure does not have sufficient electrical conductivity to effectively develop eddy currents. For example, a target would be required with a fiber reinforced plastic substructure, or a conductive substructure that is too thin to effectively develop eddy currents. The target is a sheet of conductive material such as copper or aluminum that is located adjacent the coil. The coil and target are forcefully repelled upon application of a high magnitude short duration current pulse to the coil due to opposing magnetic fields generated by current in the coil and by eddy currents in the target. This motion induces dynamic motion into the surface ply which dynamically removes accumulated ice. The target can be formed as a part of the substructure or can be formed as a part of the force displacement generation means. Also, as described in the Electro-Impulse Patent, either the target or the coil can be located immediately subjacent the primary layer. The target applies the motive force to the skin if it is located subjacent the skin. Conversely, the coil applies the motive force to the skin if it is located subjacent the skin.

The Planar Coil Patent also teaches an electro-repulsive variation similar to the Electro-Repulsive Patent. Two mirror image unitary planar coils are superposed relative to each other and electrically connected so that upon application of a high magnitude short duration current pulse to each coil, current direction is opposite in each coil. Opposing electromagnetic fields are generated in the coils which causes each coil to forcefully repel the other. This motion induces a mechanical impulse into the surface ply which removes accumulated ice. This approach differs from the Electro-Repulsive Patent which utilizes a single conductor to form the upper and lower conductors.

A type of force displacement generation means that utilizes pressurized gas is described in the Pneumatic Impulse Patent and the Integrated Pneumatic Impulse Patent. A plurality of pneumatic tubes extend in a spanwise direction subjacent a thin deflectable primary layer (the primary layer is analogous to the surface ply previously discussed). The tubes and skin are supported by a fiber reinforced plastic substructure which together form a leading edge structure with integral deicing capability. Special fittings are integrated into the tubes at various locations spaced along the span of each tube. A pneumatic impulse valve is attached to each fitting. A suitable valve is described in U.S. Pat. No. 4,878,647 PNEUMATIC IMPULSE VALVE AND SEPARATION SYSTEM, Putt et al. The valve contains a small volume (about 1 cubic inch) of high pressure air (500 to 5,000 psig). Upon activation by a solenoid, the valve quickly releases the pressurized air into each tube via the fitting. The expanding air pulse causes the tube to expand and induce mechanical motion into the skin thereby dynamically expelling accumulated ice. The expanding air pulse most preferably inflates the tube in less than 500 microseconds.

As evidenced by the previously described Electro-Repulsive, Electro-Impulse, Planar Coil, Pneumatic Impulse, and Integrated Pneumatic Impulse patents, many variations of force displacement generation means have been developed. The devices described above exhibit various advantages over older deicing systems relating to ice removal, weight, durability, life, and energy consumption. Improved force generation devices have, however, presented challenges in providing a platform capable of reliably withstanding the transferred force, because although effective ice shedding forces can be delivered, the deicer skin tends to fatigue and fail prematurely at unacceptable rates.

A deicer is therefore desired which exhibits excellent ice removal performance typical of the devices described above while having increased life and reliability.

SUMMARY OF THE INVENTION

An object of the present invention is to provide an improved composite.

Another object of the present invention is to provide an improved composite for use as the primary layer of a deicer.

Yet another object of the present invention is to provide an improved composite for use as the primary layer of a deicer, wherein the composite is reinforced selectively for providing differing skin dynamics at predetermined locations of the deicer.

According to the present invention, a composite is comprised of a woven fabric impregnated with a nitrile phenolic resin.

According to the another aspect of the present invention, a deicer includes a primary layer comprised of a woven fabric impregnated with a nitrile phenolic resin, a backing layer comprised of a woven fabric impregnated with an epoxy resin disposed beneath the primary layer, and a skin deflection means, wherein the skin deflection means deflects the skin for shedding ice accumulated thereon.

According to yet another aspect of the present invention, a deicer includes a primary layer comprised of a woven fabric impregnated with a nitrile phenolic resin, a backing layer comprised of a woven fabric impregnated "with an epoxy resin disposed beneath the primary layer, and a skin deflection means, wherein the skin deflection means deflects the skin for shedding ice accumulated thereon, and wherein the thickness of the backing layer is determined by position on the airfoil.

The present invention provides for a reliable, highly flexible protective primary layer wherein the flexibility can be tailored to maximize ice accretion. The present invention is also easy to manufacture and easy to install.

These and other objects, features and advantages of the present invention will become more apparent in light of the detailed description of exemplary embodiments thereof, as illustrated by the drawings.

BRIEF DESCRIPTION OF THE DRAWINGS

FIG. 1 is a cross-sectional view of a deicer assembly in accordance with the present invention.

FIG. 2 is an isometric view of deicing system in accordance with the present invention.

FIG. 3 is an isometric view of deicing system in accordance with a second embodiment of the present invention.

BEST MODE FOR CARRYING OUT THE INVENTION

Referring now to FIG. 1, a deicing assembly 100 in accordance with the present invention includes a deflection shell 101 disposed over a skin deflection means 102. An outer skin or layer 95 of erosion resistant material, such as Titanium foil, polyetheretherketone (PEEK) or polyurethane paint or film protects the deflection shell 101. Deicing assembly 100 is attached to an airfoil 103 which has a surface curvature that changes with position, with the highest curvature in the nose or apex area 98. Deicing assembly 100 sheds ice accumulated thereon. The term "apex" is intended to refer to the area of greatest curvature of any part of an aircraft structure that functions to meet and break an impinging airstream. The curvature is determined by the substructure 103 which supports the deicer. The substructure 103 has portions extending in the chordwise direction with decreasing surface curvature from either side of the apex 98. The surface curvature of the substructure 103 is defined by the surface immediately subjacent the skin deflection means 102. The skin deflection means 102 is comprised of a plurality of force displacement generation means 105-108. The force displacement generation means 105-108 are shown overlying both portions extending from the apex 98. Though shown overlying both portions, the invention can be practiced if the force displacement generation means overly only one portion extending from the apex 98.

Though shown changing in only the chordwise direction, the curvature can actually change in both the chordwise and spanwise directions. For most wings, the spanwise curvature will be negligible. For most engine inlets, the spanwise curvature will be much less than the chordwise curvature. In practicing the invention, the spanwise curvature can generally be ignored. However, the invention should operate even if there are abrupt changes in spanwise curvature. Therefore, for the purposes of this application, the term "curvature" refers only to the chordwise curvature.

A compressible zone 104 divides the force displacement generation means 102 which overly both portions of the substructure 103 extending from the apex 98. The substructure 103 provides the structural integrity necessary to absorb and resist flight loads and unexpected impacts with foreign objects. The substructure can be formed from a metal, such as aluminum, or fiber reinforced plastic materials that are commonly used on aircraft such as epoxy impregnated glass or graphite fabrics. Together, the deicer 100 and substructure 103 form a leading edge with integral deicing capability.

The compressible zone 104 is a zone having elastic properties. The term "elastic" refers to the tendency of a material to return entirely to its rest state within a short period of time after an imposed force is removed. Examples of suitable materials for the compressible zone include but are not limited to natural rubber, and synthetic rubbers such as butyl or silicone rubber.

The force displacement generation means 105-108 consist of a plurality of expandable pneumatic tubes. The tubes 105-108 can be formed from fiber reinforced plastic material, or rubber coated fabric. Examples of suitable inflatable force displacement means for the present invention are described in commonly owned U.S. Pat. Nos. 4,706,911, 4,826,108 and 4,836,474 which are hereby incorporated herein by reference.

The deicer 100 is activated by sequentially releasing small quantities of compressed air into the tubes 105-108 as described in the Integrated Pneumatic Impulse Patent. Inflation of a tube is preferably achieved in less than 0.1 second and most preferably in less than 500 microseconds.

Deicing assembly 100 has an "active area", which is that portion of the deflection shell 101 that is dynamically activated by the force displacement generation means 105-108 in a manner that removes ice accumulations. For example, the active area of deicer 100 includes any area of deflection shell 101 covering tubes 105-108 and the compressible zone 104.

The ability of deicing assembly 100 to shed ice is dependent upon a multitude of factors, many of which concern the performance characteristics of deflection shell 101, such as its dynamics (i.e. the dynamic displacements, velocities, and accelerations at various locations on the skin). As the movement rate of the surface increases, minimum ice removal thickness decreases along with the quantity of residual ice left after ice cap removal. In general, a peak skin acceleration of at least 3000 g's (1 g=32.2 f/sec$^2$) at a peak frequency of at least 2000 hertz with a minimum peak deflection of 0.020 inch is desirable. Much greater accelerations, however, may be necessary depending on ice removal requirements.

The dynamic frequency response of a thin deflectable skin is generally increased by increasing its modulus of elasticity. Skins with increased modulus of elasticity, however, tend to have poor reliability due to fatigue related failures. A balance between dynamic responsiveness and resistance to fatigue must be achieved by the deflection shell 101.

Deflection shell 101 of the present invention provides an optimal balance and is comprised of a primary layer 116 and a backing layer 115. The primary layer 116 is a high strength, highly flexible composite for providing good surface dynamics while being resistant to environmental erosion. Backing layer 115 is a high strength, stiffer composite (stiffer than primary layer 116) for providing stiffness to the deflection shell 101 in selected areas in order to restrict deflections or excursions from the skin deflection means 102.

Primary layer 116 is comprised of a high strength fabric reinforced with a nitrile phenolic resin or adhesive, hereinafter referred to as a phenolic prepreg. A nitrile phenolic is a phenolic resin blended with nitrile rubber. Preferred fabrics for primary layer 116 are woven graphite such as catalog no. CGG300 manufactured by Ciba Geigy, fiberglass such as catalog no. MXB 7669-120 manufactured by Fiberite, or KEVLAR such as catalog no. MXB 7669-KEVLAR manufactured by Fiberite. KEVLAR is a registered trademark of E.I. DuPONT de NEMOURS & COMPANY, for aramid fiber products. A preferred nitrile phenolic adhesive for reinforcing the fabric is catalog no. AF32 manufactured by 3M.

The preferred method of manufacturing the phenolic prepreg primary layer 116 is as follows. Provide a bottom separator or release layer, preferably of tetrafluoroethylene coated fiberglass fabric, such as catalog no. 02232 manufactured by Furon, CHR division. Apply a light coat of a phenolic cement, such as catalog no. A626B manufactured by BFGoodrich to the release layer. Provide a layer of nitrile phenolic, such as film adhesive catalog no. AF32 manufactured by 3M onto the release layer. Provide the fabric layer of choice onto the nitrile carrier layer. Apply a liberal coat of phenolic cement, such as catalog no. A626B manufactured by BFGoodrich to the fabric layer. Apply a release layer, such as catalog no. 02232 manufactured by Furon-CHR onto the fabric layer. Place the composite into a vacuum bag under full vacuum until the nitrile phenolic fully migrates into the fabric layer (approximately five days). Let the phenolic prepreg then air dry (approximately 2 days).

Backing layer 115 provides stiffness to the primary layer 116 and is comprised of a fabric reinforced with an epoxy adhesive or resin, hereinafter referred to as an epoxy prepreg. Preferred fabrics for backing layer 115 are the same as the fabrics utilized for primary layer 116, with woven graphite providing the most favorable results. The preferred backing layer 115 for the present invention is catalog no. R6376/CGG108 manufactured by Ciba Geigy.

It is to be noted that the high strength fabrics utilized for the primary layer 116 or the backing layer 115 may be either square woven or unidirectional. If square woven fabric is utilized, the fabric should be oriented so that the weave angled with respect to the either the chord line or the span line of the airfoil, with the preferred angle of orientation being 45°.

Rapid inflation of tubes 105-108 deflects the deflection shell 101 outward developing tension in deflection shell 101. The tension in deflection shell 101 compresses the compressible zone 104, allowing the deflection shell 101 to move inward over the compressible zone 104. This movement must occur rapidly enough to debond and shatter the ice cap 110 and eject the side ice-pieces 112 into the surrounding airflow 109 where they are swept away from the deicer 100. The compressed air is subsequently vented from tube 107, and the deflection shell 101 snaps back to its rest position due to the elastic properties of the deflection shell 101 and compressible zone 104. The process is repeated by inflation of tube 106 resulting in removal of side ice-pieces 118. The deflection shell 101 over the compressible zone 104 moves inward upon inflation of any of the tubes 105-108. Deflection shell 101 over the compressible zone is deflected each time one of the tubes 105-108 is inflated.

It has been found that the ability of the deicer assembly 100 to shed ice is dependent, among other things, on the dynamics of the system as determined by the shape of the mechanical force function provided by the skin deflection means and the way the deflection shell 101 transfers that force. The deflection shell 101 interacts with the deflection means to provide an output deflection. As described hereinbefore, the primary layer 116 of deflection shell 101 is very flexible, and therefore does not offer much resistance to the force provided from the skin deflection means 102. The backing layer 115, however is much stiffer and therefore offers more resistance to the force, depending on the thickness of layer 115. Another factor affecting how deflection shell 101 transfers the force is curvature of the surface. Curvature of the surface is proportional to the resistance to deflection. A high curvature surface, such as at the apex 98 of airfoil 103 as discussed hereinbefore, offers high resistance. The backing layer 115 thickness, must therefore be smaller near the apex where the curvature is greatest than in other areas with lower curvature, in order to maintain adequate surface dynamics. FIG. 1 illustrates a backing layer which has a taper 117 that starts near the ends of tubes 106, 107 and ends at the compressible zone 104 on both sides of apex 98. The backing layer thickness goes from about 0.013 inches to no thickness. This taper reduces the thickness of backing layer 115 as the curvature near the apex is increased until there is no backing layer over the compressible zone 104. Deflection shell 101 therefore may be designed to maintain effective skin dynamics at high curvature areas, such as near the apex 98 of the airfoil, by varying the thickness of the backing layer 115. An effective way to increase the thickness of backing layer 115 is simply to bond a plurality of epoxy prepreg layers together. The thickness of the backing layer 115 may be reduced, such as the taper near apex 98 by machining.

Referring now to FIG. 2, a deicer assembly in accordance with the present invention includes a deflection shell 101 disposed over a skin deflection means 102, which is attached to an airfoil 103. Outer skin or layer 95 protects the deflection shell 101. A pressurized fluid source 120 supplies pressurized fluid, such as air, through a line 122 to the expandable tubes 105-108. As described hereinbefore, effective ice shedding is dependent on interaction between the delivered mechanical force function and the transfer characteristics or dynamics of the deflection shell 101. Curvature of the airfoil has been discussed as one factor affecting that interaction. Another factor affecting ice accretion characteristics is the spanwise length of the airfoil if expandable pneumatic tubes are utilized, because the characteristics of a fluid "pulse" moving along the length of an expandable tube change with respect to the distance of the pulse from the entry point of the pulse into the tube. Assuming, for exemplary purposes, that the thickness of deflection shell 101 in FIG. 2 remains constant the spanwise length of the airfoil. Under these conditions, as pressurized fluid escapes the fluid line 122 and enters tubes 105-108 to cause expansion thereof, the fluid pulse (as measured as deflection of deflection shell 101) in the tubes near the entry point can be described as having a long rise time, a high peak deflection and high energy. At the entry point, backing layer 115 provides stiffness to deflection shell 101 in order to restrict too much deflection from the high energy pulse. As the pulse travels in the spanwise direction, the pulse changes characteristics, wherein the rise time of the pulse becomes shorter, the peak deflection becomes lower and the energy level becomes lower. A short distance from the entry point, the fluid pulse has more favorable dynamic characteristics because the energy level has been reduced and the pulse has a shorter rise time, but deflection shell 101 may be too stiff to effectively respond to the favorable pulse characteristics for effective ice removal. At much longer distances from the entry point, the energy level of the pulse becomes much lower and the deflection shell 101 is much too stiff to react to the much lower energy level pulse.

It has been found that changing the thickness of the backing layer 115 of deflection shell 101 in the spanwise direction of the airfoil may compensate for these changing characteristics of the pulse. For instance, a reference point 124 illustrates where fluid line 122 enters tube 107. A reference line 126 illustrates a distance approximately 12 inches in the spanwise direction from reference point 124. Another reference line 128 illustrates a distance approximately 24 inches in the spanwise direction from reference point 124. Another reference line 130 illustrates a distance approximately 7.5 feet in the spanwise direction from reference point 124. Under these conditions, it is preferred that backing layer be on the order of 0.026 inches thick from reference point 124 out to reference line 126. Past 12 inches, or reference line 126, the preferred thickness of backing layer 115 is 0.013 inches until about 7.5 feet away, or reference line 130. After about 7.5 feet away backing layer 115 may be eliminated altogether. In this manner, it is clear to one skilled in the art that a long spanwise deicing assembly may be constructed for maximum effectiveness.

Referring now to FIG. 3, wherein a deicing system in accordance with a second embodiment of the present invention is generally similar to the deicing system illustrated hereinbefore in the previous figures and is thus indicated by references numerals corresponding to those discussed above, except that a 200 "prefix" is utilized. The deicing system includes a deicing assembly 200 for attachment to an airfoil 203, the deicing assembly including a deflection shell 201 disposed over a force displacement generation or skin deflection means 202. An outer skin or layer 295 of erosion resistant material, such as Titanium foil, polyetheretherketone (PEEK) or polyurethane spray or film protects the deflection shell 201. A compressible zone 204 is located at the apex 298 of airfoil 203. The deflection shell 201 includes a primary layer 216 disposed on a backing layer 215. Skin deflection means 202 is comprised of a plurality of expulsive electromagnetic apparatus 205-208 and 250-251. Examples of electromagnetic apparatus that can be employed as force displacement generation means 202 are disclosed in commonly owned U.S. Pat. Nos. 4,875,644 and 5,129,598, which are hereby incorporated herein by reference. Skin deflection means 202 is provided electrical energy from a circuit 260 through a line 262.

It is to be noted that the specific configuration for force displacement generation means (e.g. quantity of force elements and their location) is not intended to be limited by the present invention and will be dependent upon each application.

Although the invention has been shown and described with exemplary embodiments thereof, it should be understood by those skilled in the art that the foregoing and various other changes, omissions and additions may be made therein and thereto without departing from the spirit and the scope of the invention.

We claim:

1. A deicer for attachment to an airfoil comprising:
   a composite primary layer comprised of a fabric impregnated with a nitrile phenolic resin; and,
   distortion means for providing distortion forces for distorting said primary layer in order to impose strain in ice accumulated thereabove.
   wherein said primary layer interacts with said distortion means to transfer said distortion forces with increased resistance to fatigue.

2. A deicer for attachment to an airfoil in accordance with claim 1, wherein said fabric is comprised of square woven fabric.

3. A deicer for attachment to an airfoil in accordance with claim 1, wherein said fabric is comprised of unidirectional fabric.

4. A deicer for attachment to an airfoil in accordance with claim 1, wherein said fabric is comprised of woven graphite.

5. A deicer for attachment to an airfoil in accordance with claim 1, wherein said fabric is comprised of fiberglass.

6. A deicer for attachment to an airfoil in accordance with claim 1, wherein said fabric is comprised of aromed fiber.

7. A deicer for attachment to an airfoil in accordance with claim 1, wherein said distortion means is comprised of:
   at least one inflatable member; and,
   means for inflating said at least one inflatable member.

8. A deicer for attachment to an airfoil in accordance with claim 1, wherein said distortion means is comprised of:
   electromagnetic separation means having first and second elements which are forcefully separated from one another; and,
   circuit means for providing current to said electromagnetic separation means.

9. A deicer for attachment to an airfoil comprising:
   an erosion layer comprised of an erosion resistant material, said erosion layer having an exposed top side;
   a composite primary layer disposed beneath said erosion layer comprised of a fabric impregnated with a nitrile phenolic resin; and,
   distortion means for providing distortion forces for distorting said primary layer and said erosion layer in order to impose strain in ice accumulated on said erosion layer,
   wherein said primary layer interacts with said deflection means to transfer said distortion forces with increased resistance to fatigue.

10. A deicer for attachment to an airfoil in accordance with claim 9, wherein said fabric is comprised of square woven fabric.

11. A deicer for attachment to an airfoil in accordance with claim 9, wherein said fabric is comprised of unidirectional fabric.

12. A deicer for attachment to an airfoil in accordance with claim 9, wherein said fabric is comprised of woven graphite.

13. A deicer for attachment to an airfoil in accordance with claim 9, wherein said fabric is comprised of fiber glass.

14. A deicer for attachment to an airfoil in accordance with claim 9, wherein said fabric is comprised of aromed fiber fabric.

15. A deicer for attachment to an airfoil in accordance with claim 9, wherein said distortion means is comprised of:
   at least one inflatable member; and,
   means for inflating said at least one inflatable member.

16. A deicer for attachment to an airfoil in accordance with claim 9, wherein said distortion means is comprised of:
   electromagnetic separation means having first and second elements which are forcefully separated from one another; and,
   circuit means for providing current to said electromagnetic separation means.

* * * * *